United States Patent [19]

Foster

[11] 4,304,418
[45] Dec. 8, 1981

[54] SNOWMOBILE SLED

[76] Inventor: Thomas R. Foster, 602 Water St., Warren, Ill. 61087

[21] Appl. No.: 101,895

[22] Filed: Dec. 10, 1979

[51] Int. Cl.³ .............................................. B62B 15/00
[52] U.S. Cl. ..................................... 280/19; 180/190; 280/24
[58] Field of Search ................ 280/12 C, 12 E, 12 M, 280/24, 28, 19, 18, 7.14, 7.17, 416, 414 R, 7.12, 12 R, 12 A, 15, 28.5, 107; 180/190, 182, 183

[56] References Cited

U.S. PATENT DOCUMENTS

| 1,026,014 | 5/1912 | Whitney | 280/24 |
| 2,437,767 | 3/1948 | Thompson | 280/19 |
| 2,786,691 | 3/1957 | Martin | 280/12 E |
| 3,149,738 | 9/1964 | Bombardier | 180/182 |
| 3,464,735 | 9/1969 | Smith | 280/24 |
| 3,503,620 | 3/1970 | Koskovich et al. | 180/182 |
| 3,563,562 | 2/1971 | Carlin | 180/182 |
| 3,746,357 | 7/1973 | Haskins | 280/24 |
| 3,921,998 | 11/1975 | Broughton et al. | 280/19 |
| 4,025,081 | 5/1977 | Bintz | 180/183 |

Primary Examiner—David M. Mitchell
Attorney, Agent, or Firm—Anthony S. Zummer

[57] ABSTRACT

This invention relates to an improved snowmobile sled which is particularly adapted for supporting a track of a snowmobile while the snowmobile is being towed. The instant snowmobile sled includes a pair of runners. A bracket connects the heel portion of the runners to each other. A bridge connects the central portion of the runners to each other. The bridge includes a crossbeam which is adapted for engaging and supporting the track of the snowmobile.

6 Claims, 7 Drawing Figures

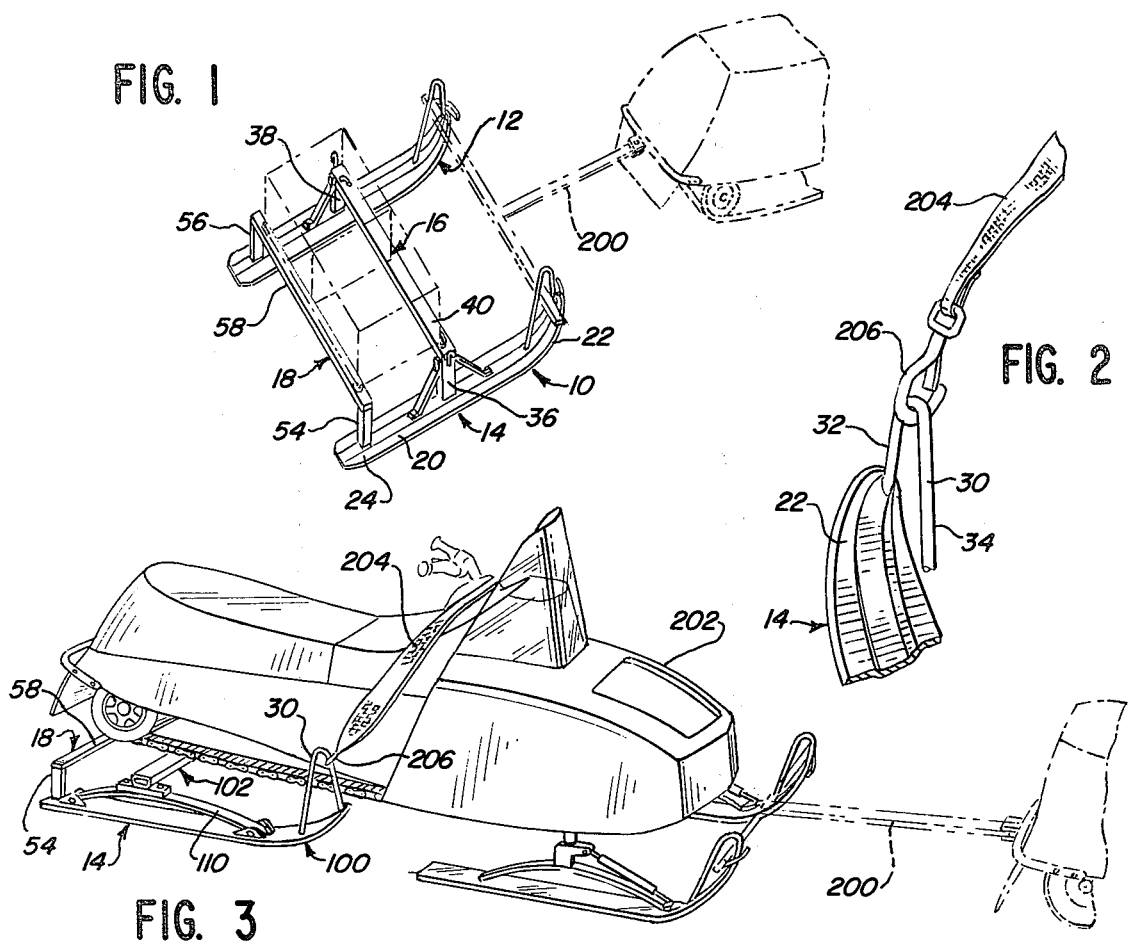

SNOWMOBILE SLED

BACKGROUND OF THE INVENTION

Snowmobiles as such as ordinarily driven by internal combustion engines. As any mechanical device, the internal combustion engine may fail for any one of a variety of reasons. Inasmuch as snowmobiles are usually operated in woods and other places where conventional vehicles are unable to travel, when a snowmobile becomes disabled, it is necessary to tow the disabled snowmobile to a shop for repairs. The fundamental construction of a snowmobile is one in which a snowmobile includes a pair of runners which are used for guiding the snowmobile and a track which is driven. The track is designed to engage the snow with a maximum amount of engagement for driving the snowmobile. When it becomes necessary to tow a snowmobile, the track is a substantial hindrance to easy towing of the snowmobile because the engagement of the snow by the track creates a drag through the snow as the snowmobile is being towed. It is desirable to prevent the track from engaging the snow and thereby eliminate the drag.

There are a number of devices for supporting a snowmobile while the snowmobile is being towed. These devices are shown in U.S. Pat. Nos. 3,503,620, 4,025,081 and 3,563,562. What is needed is a device which may be easily placed under a snowmobile track for supporting and carrying a snowmobile track when the snowmobile is being towed, and thus may be easily removed.

SUMMARY OF THE INVENTION

The present invention is directed to an improved construction of a snowmobile sled for supporting a track of a snowmobile while the snowmobile is being towed. The snowmobile sled may also be utilized to carry materials while being towed by a snowmobile.

The sled includes a pair of runners, a bridge connects the central portion of each of the runners to each other. The bridge has a crossbeam having its opposite ends connected to each of the runners. The sled also includes a bracket connected to the heel portion of each of the runners. The bracket includes a beam which interconnects the heel portion of the runners. The crossbeam of the bridge and the bracket beam are adapted for either supporting a container for carrying goods or for supporting the track of a snowmobile. It is therefore a principle object of this invention to provide a snowmobile sled which may be easily secured to a snowmobile for supporting a snowmobile while the snowmobile is being towed.

It is a further object of the present invention to provide a snowmobile sled which may also be used for carrying other items while being towed by a snowmobile.

It is a still further object of the instant invention to provide an improved snowmobile sled construction which is economical to manufacture, light wieght, and easy to use.

Other objects and uses of the herein disclosed invention will become readily apparent to those skilled in the art upon perusal of the following specification in light of the accompanying drawings.

BRIEF DESCRIPTION OF THE DRAWINGS

FIG. 1 is a perspective view of a snowmobile sled embodying the present invention shown with a container mounted on the sled in phantom view and shown connected to a tow bar and a portion of a snowmobile all in phantom view;

FIG. 2 is an enlarged fragmentary perspective view of a portion of a strap hooked to a loop of a runner of the instant snowmobile sled for securing the snowmobile sled to a snowmobile;

FIG. 3 is a perspective view showing a snow-mobile mounted on a snowmobile sled embodying the present invention;

FIG. 4 is a side elevational view of the snowmobile sled of FIG. 1 showing a bridge construction having a central post;

FIG. 5 is a side elevational view of a snowmobile sled construction shown in FIG. 3 with a bridge construction having a leaf span;

DESCRIPTION OF THE PREFERRED EMBODIMENT

Figure 6:
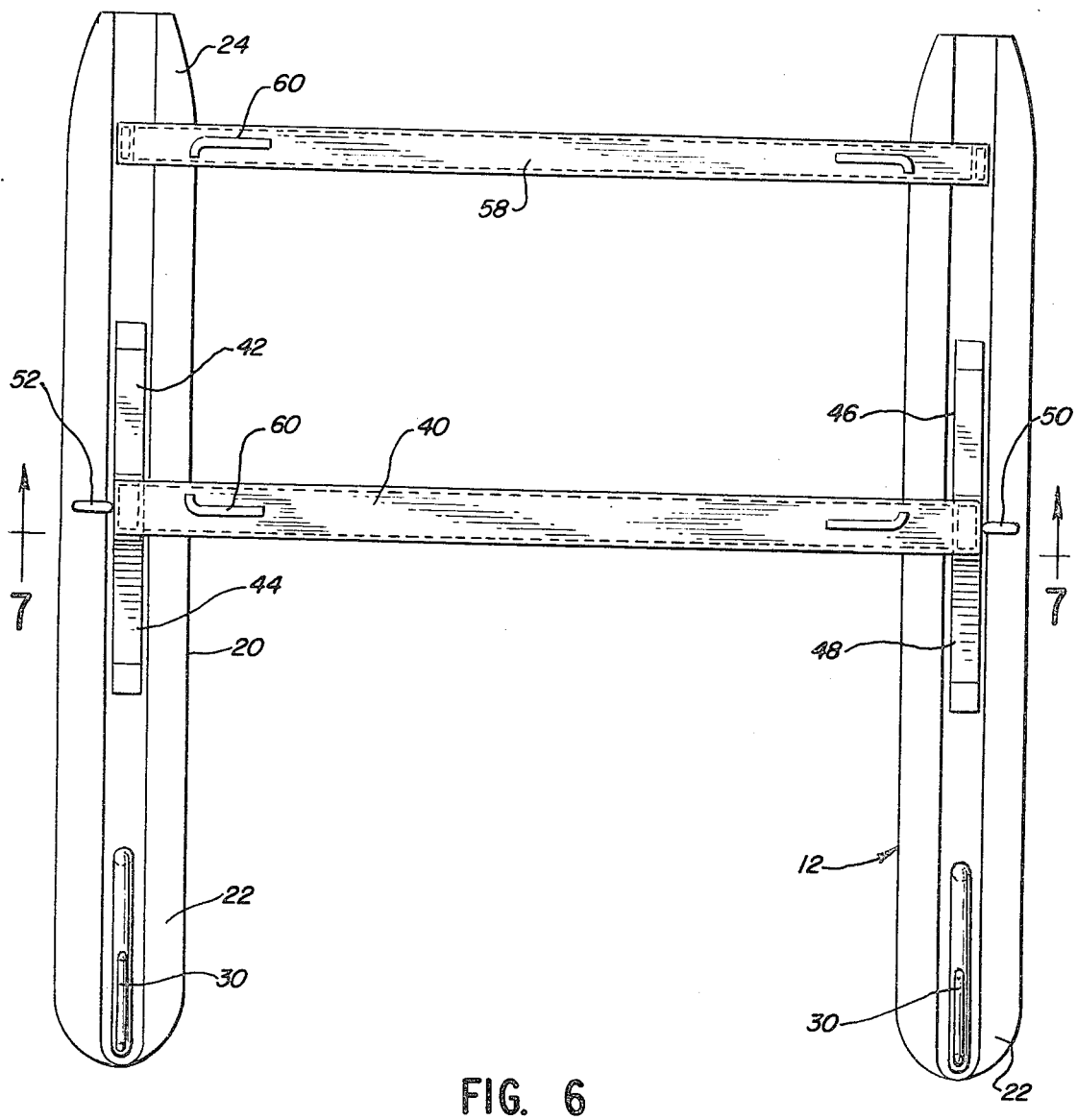
FIG. 6 is a plan view of the snowmobile sled of FIG. 4.
Figure 7:
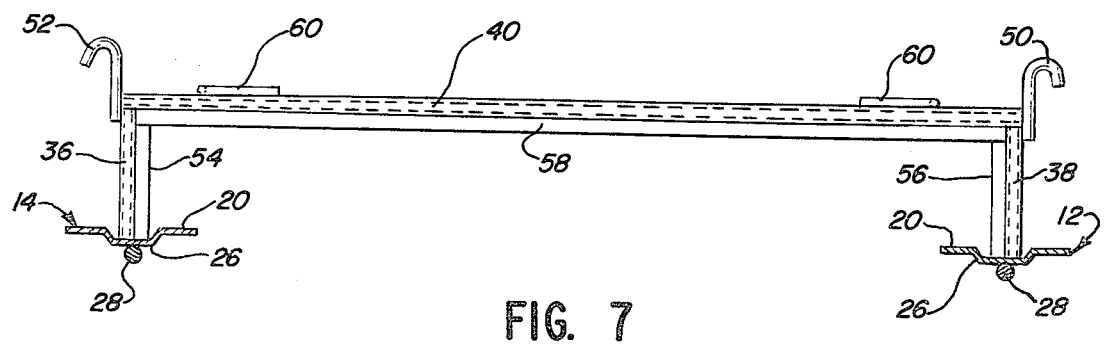
FIG. 7 is a cross-sectional view taken on line 7—7 of FIG. 6.

Referring now to the drawings and especially to FIG. 1, a snowmobile sled generally indicated by number 10 embodying the herein disclosed invention is shown therein. The snowmobile sled includes a pair of identical runners 12 and 14 which are connected to each other by a bridge 16 and by a bracket 18.

Referring now to the construction of runner 14 which is identical to runner 12, runner 14 includes a main body 20 with an upturned toe 22 formed therein. The body includes a base 24 with a ridge 26 formed in the body. An elongated rod 28 is fixed under the bottom of the ridge for impressing a grove in supporting snow. The runner has a U-shaped loop 30 fixed to toe 22. The U-shaped loop includes a forward arm 32 which is fixed adjacent to the forward portion of the toe and a rear arm 34 which is spaced away from forward arm 32. Loop 30 is of sufficient height so that a snowmobile body may be held between the loops of runners 12 and 14.

Bridge 16 includes a pair of posts 36 and 38 which are mounted on the central portion of runners 14 and 12, respectively. A crossbeam 40, which is a piece of hollow rectangular tubing, has its opposite ends fixed to posts 36 and 38. A pair of brackets 42 and 44 is fixed to runner 14 and to the crossbeam 40 to support the crossbeam and post 36 in an upright attitude. A like pair of brackets 46 and 48 supports the other end of the crossbeam and post 38. A pair of hooks 50 and 52 is mounted on opposite ends of crossbeam 40 adjacent to the posts 36 and 38, respectively.

Bracket 18 includes a pair of posts 54 and 56 fixed to the heel portions of runners 14 and 12, respectively. A beam 58 has its opposite ends fixed to posts 54 and 56. The beam 58 is also rectangular tubular member which is adapted for supporting a snowmobile track.

A container support is mounted on beam 58 and crossbeam 40. The container support consists of four stops 60, two of which are mounted on beam 58 and two of which are mounted on beam 40. Each of the stops is an L-shaped rod which is welded onto its respective supporting member. A container, or pair of containers, may be positioned between the stops for carrying materials on the sled as shown in phantom view in FIG. 1.

A snowmobile sled 100 embodying the present invention is shown in FIGS. 3 and 5. The snowmobile sled 100 is identical in its construction to snowmobile sled 10 except for the specific construction of its bridge as is described in detail hereinafter. Those parts which are identical to sled 10 are given like numbers in relation to snowmobile sled 100. Snowmobile sled 100 includes a pair of runners 12 and 14 with a bracket 18 connecting the heel portion and a bridge 102 connecting the central portion of the runners. The details of the other parts of sled 100 are not described in detail inasmuch as they have been described heretofore, however, the description of bridge 102 is set forth in detail.

Bridge 102 includes a pair of opposed identical sides 104, one of which is shown in detail in FIGS. 3 and 5. Side 104 includes a pair of buttress mounts 106 and 108 which are secured to runner 14 and spaced along the runner. A leaf support 110 has one end pivotally secured to buttress mount 106 and the opposite end pivotally secured to buttress 108. A base 112 is fastened to the central portion of leaf support 110 by conventional fasteners 114. A crossbeam 116, which is identical in construction to crossbeam 40, is fixed to base 112 and extends between the runners 12 and 14. A pair of hooks 118 is secured to the opposite ends of crossbeam 116. Crossbeam 116 also has the stops 60 mounted thereon as does crossbeam 40.

Irrespective of whether sled 10 or sled 100 is utilized, a disabled snowmobile may be easily towed by another snowmobile with a towbar 200 connecting the sled to the other towing snowmobile. A towbar for towing a sled or a snowmobile is disclosed in detail in the applicant's accompanying application entitled SNOWMOBILE TOWBAR which is Ser. No. 101,893, filed Dec. 10, 1979. When the sled is being towed and not supporting a snowmobile, a container, or a pair of containers, may be mounted on the bridge and bracket and held thereon by stops 60. The instant snowmobile sled adapts itself to use by snowmobile clubs or groups wherein equipment or food and drink may be carried along on the sled.

In the event that a snowmobile is disabled, the snowmobile sled is disconnected from the towbar and the snowmobile sled has the container removed. The snowmobile sled is easily positioned under a disabled snowmobile simply by raising the rear end of the snowmobile such as snowmobile 202 and sliding the sled forward. The loops 30 on the runners position the snowmobile sled so that the disabled snowmobile is over the sled and the sled is pushed forward until it engages the front portion of the snowmobile. The track of the sled is placed on the crossbeam of the bridge and on the beam of the bracket. The snowmobile is secured to the sled by placing a strap 204 over the sled with snaps 206 in engagement with loops 30. In the event that two containers are carried on the sled, the two containers may be placed on opposite sides of the sled on the crossbeam of the bridge and an elastic strap is placed in the hooks of the bridge to hold the container in position adjacent to snowmobile 202. Towbar 200 is then attached to snowmobile 202 as shown in FIG. 3 so that snowmobile 202 may be readily towed in view of the fact that its track is no longer in engagement with the snow but rather the track is supported on the sled.

It may be readily appreciated that sled 10 provides a heavy duty sled in view of the fact that the bridge is supported by a pair of posts 36 and 38 whereas the sled 100 provides a resilient support for the crossbar in view of the fact that the crossbeam is supported on leaf supports 110.

Although specific embodiments of the herein disclosed invention have been shown and described in detail, it is readily apparent that those skilled in the art may make various modifications and changes without departing from the spirit and scope of the present invention. It is to be expressly understood that the instant invention is limited only by the appended claims.

What is claimed is:

1. A snowmobile sled for supporting a track of a snowmobile while the snowmobile is being towed comprising; a pair of runners, a bracket connecting the rear portion of each of the runners to each other, a bridge connecting the central portion of each of said runners to each other, said bridge having a crossbeam with its opposite ends connected to each of said runners and being adapted to support a snowmobile track, and a loop mounted on a toe portion of each of said runners for positioning a snowmobile between the loops and to provide a means for attaching a strap to the runners to secure the sled to the snowmobile.

2. A snowmobile sled for supporting a track of a snowmobile while the snowmobile is being towed comprising; a pair of runners, a bracket connecting the rear portion of each of the runners to each other, a bridge connecting the central portion of each of said runners to each other, said bridge having a crossbeam with its opposite ends connected to each of said runners and being adapted to support a snowmobile track, and a hook fixedly connected to each end of the crossbeam, whereby said hooks are adapted to engageably receive a strap for holding a container on the sled.

3. A snowmobile sled for supporting a track of a snowmobile while the snowmobile is being towed comprising: a pair of runners; a bracket connecting the rear portion of each of the runners to each other; and a bridge connecting the central portion of each of said runners to each other; said bridge including; a pair of buttresses fixed to each runner and spaced axially along each runner, a leaf having its opposite ends hingedly mounted on each pair of buttresses and a crossbeam connected at its opposite ends to the central portion of each leaf for interconnecting the runners, said crossbeam being adapted to support a snowmobile track.

4. A snowmobile sled for supporting a track of snowmobile while the snowmobile is being towed comprising: a pair of runners, each of said runners having a ridge on the underside thereof for riding in snow, and a rod fixed to each ridge and extending along the ridge for impressing in snow; a bracket connected to the rear portion of each of the runners connecting the runners to each other, said bracket including, a column fixed to the upper portion of the rear of each of the runners, said column being substantially perpendicular to the runner, and a rectangular tubular crossbar fixed to the upper end of each of the columns to interconnect the columns and the runners; an upwardly extending loop mounted on a toe portion of each of said runners for positioning the snowmobile between the loops and to provide a means for attaching a strap to the runners to secure the sled to the snowmobile; a bridge connecting the central portion of each of said runners to each other, said bridge having a rectangular tubular crossbeam with its opposite ends connected to each of said runners and being adapted to support the snowmobile track; a hook fixedly connected to each end of the crossbeam, whereby said hooks are adapted to receive a strap for holding a container on the sled; a pair of basket stops mounted on the beam; and a second pair of basket stops mounted on the crossbar, whereby said pairs of basket stops cooperated to provide a means for removably retaining a container on the sled.

5. A snowmobile sled for supporting a track of a snowmobile while the snowmobile is being towed as defined in claim 4 wherein the bridge includes; a pair of hinge buttresses fixed to each runner and being spaced apart axially along the respective runner, a flexible leaf having its opposite ends hingedly mounted in each pair of buttresses, and said crossbeam being connected at its opposite ends to the central portion of each leaf for interconnecting the runners.

6. A snowmobile sled for supporting a track of a snowmobile while the snowmobile is being towed as defined in claim 4 wherein said bridge includes; a post fixed to the central portion of each of the runners, each of said posts being substantially perpendicular to its respective runner, said crossbeam having its opposite ends connected to the upper end of each of the posts, and a pair of braces connecting each end of the crossbeam and its respective runner to stablize the respective post and the crossbeam.

* * * * *